April 1, 1941.     W. M. THOMAS ET AL     2,236,631

MECHANISM FOR REVERSE DRIVES

Filed Dec. 29, 1939

Inventor,
W. M. Thomas &
J. Cotal

By Glascock Downing & Seebold Attys.

Patented Apr. 1, 1941

2,236,631

UNITED STATES PATENT OFFICE 2,236,631

MECHANISM FOR REVERSE DRIVES

William Miles Thomas, Four Oaks, England, and Jean Cotal, Paris, France

Application December 29, 1939, Serial No. 311,684
In France November 7, 1938

2 Claims. (Cl. 74—298)

The present invention has for its object a mechanism for reverse drive, which provides for the forward motion and the back motion of the driven shaft, and is chiefly characterized by the fact that it comprises a braking device, preferably of the electro-magnetic type, which is adapted to hold the said driven shaft in position when it has a tendency to be operated, with the engine running and the reversing device at the dead centre.

The said mechanism is applicable to systems of propulsion for vessels, vehicles and various means of transportation, and herein the engine can rotate at the dead centre without being subjected to a driving which is improper and may even be dangerous. In particular, in the case of vessels, by holding the propeller in the fixed position, it prevents it from striking, when in rotation, against foreign bodies by which it may be damaged.

In the accompanying drawing, which is given solely by way of example:

Figure 1:
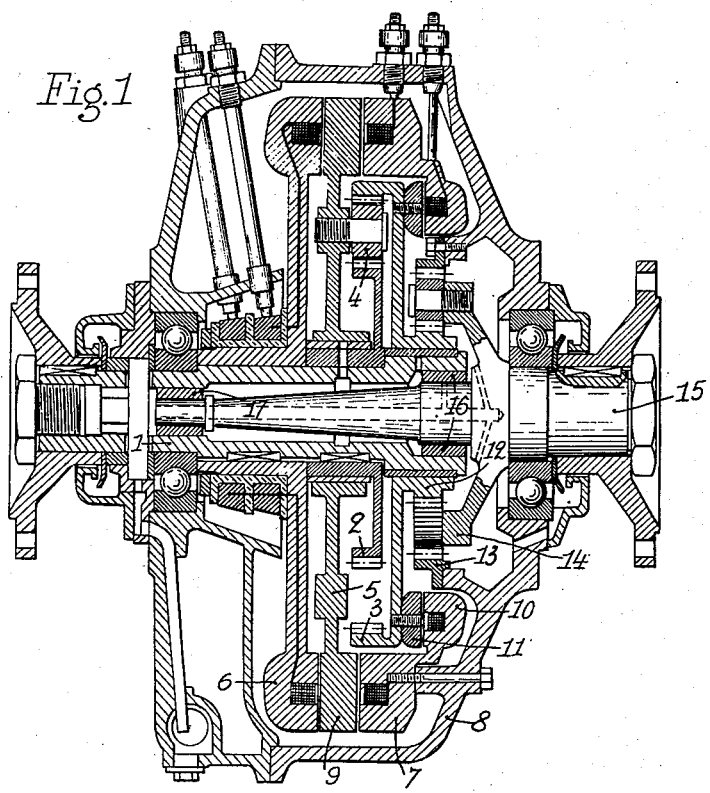
Fig. 1 is a longitudinal section of a reversing mechanism adapted for electro-mechanical control, with an electro-magnet for stopping the driven shaft and a permanent planetary reducer, according to the invention.

In the embodiment represented in Fig. 1, the mechanism consists essentially of two sets of hypocycloidal gearing. The first set is mounted on the driving shaft 1, and constitutes the reversing device. It comprises a sun wheel 2 which is keyed to the shaft 1, an annulus 3 which is loose on this shaft, and planetary pinions 4, mounted on a planetary pinion carrier 5.

The operation of this set of gearing is controlled by an electro-magnet 6 secured to the driving shaft 1, and by an electro-magnet 7 secured to the casing 8. An armature 9, common to both electro-magnets, is secured to the planetary pinion carrier 5 of the planetary set which is loosely centered on the driving shaft 1. A second electro-magnet 10 which may be either secured to the electro-magnet 7 or fixed upon the casing 8 independently of the electro-magnet 7 is adapted to hold in the fixed position an armature 11 which participates in the rotation of the annulus 3 mounted loose on the driving shaft 1.

The second planetary gear set serves as a permanent speed-reducer. The small sun wheel 12 of this set is secured to the annulus 3 of the other set, and the large annulus 13 is fixed upon the casing. The planetary pinion carrier 14 is secured to the driven shaft 15 which enters into the driving shaft 1, for which it ensures the exactly concentric position by means of suitably placed bearings 16 and 17.

The operation is as follows:

For the forward motion, the armature 9 adheres to the rotatable electro-magnet 6 which is now energized. The planetary pinion carrier 5 and the sun wheel 2 are thus connected together, and the annulus 3 is driven at the same speed and in the same direction as the driving shaft 1. By the operation of the reducing set 12, 13, 14, the driven shaft 15 is also driven in the same direction but at reduced speed.

For the back motion, the armature 9 adheres to the electro-magnet 7 which is now energized. The planetary pinion carrier 5 is thus held fast, and the annulus 3 is driven by the planetary pinions 4 in the contrary direction to the sun wheel 2 and to the driving shaft 1. The driven shaft 15, by the operation of the reducing set 12, 13, 14, will thus rotate at reverse drive with a reduced speed.

For the braking, the electro-magnet 10 is alone energized, and it holds the annulus 3 and hence the planetary pinion carrier 14 and the driven shaft 15 in the fixed position. This shaft is maintained in the stopped position even though it should be urged by the rotation of the engine and by the passive resistances, or by the propelling devices such as propellers, wheels or the like.

Figure 2:
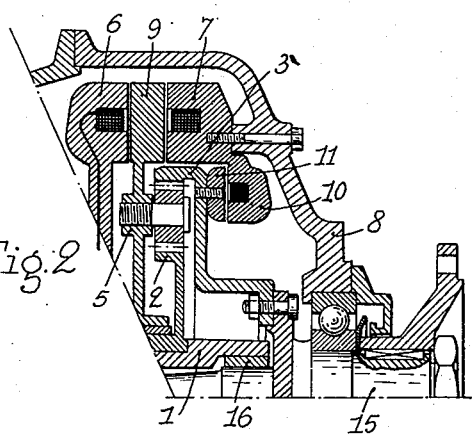
Fig. 2 is a partial section of the same device, but without a permanent reducer.

Fig. 2 shows a modification which does not comprise a permanent reducer, and herein the braking takes place directly upon the driven shaft 15, by means of the annulus 3 to which it is secured.

Obviously, the invention is not limited to the embodiments herein described and represented, which are given solely by way of example.

In the case of Fig. 1, it is further possible to mount the braking armature directly upon the driven shaft.

It is evident that the braking device is applicable, irrespectively of the constructional form of the reversing device itself.

Having now described our invention, what we claim as new and desire to secure by Letters Patent is:

1. A mechanism for reverse drive comprising in combination a driving shaft, a driven shaft, a sun wheel secured to said driving shaft, a rotatable annular wheel, a pinion carrier carrying at least one planetary pinion meshing with said sun wheel and with said annular wheel, selective means adapted to bring said pinion carrier selectively in three different positions, the one in which said carrier is held against rotation, the second in which said pinion carrier is connected with one of said wheels and the third in which said carrier assumes an inoperative position between the two first mentioned positions, means connecting said annular wheel with said driven shaft, and braking means adapted to hold against rotation said annular wheel and driven shaft when said carrier assumes its inoperative position, said braking means including an armature secured to said rotatable annular wheel and a stationary electromagnet adapted when energized to attract said armature and to hold said armature and said annular wheel against rotation.

2. A mechanism for reverse drive comprising in combination a driving shaft, a driven shaft, a sun wheel secured to said driving shaft, a rotatable annular wheel, a pinion carrier carrying at least one planetary pinion meshing with said sun wheel and with said annular wheel, selective means adapted to bring said pinion carrier selectively in three different positions, the one in which said carrier is held against rotation, the second in which said pinion carrier is connected with one of said wheels and the third in which said carrier assumes an inoperative position between the two first mentioned positions, means connecting said annular wheel with said driven shaft, and braking means adapted to hold against rotation said annular wheel and driven shaft when said carrier assumes its inoperative position, said selective means including an armature secured to said pinion carrier, two electromagnets on either side of said pinion carrier adapted when energized to attract said armature, one of said electromagnets being stationary and the other being connected to one of said wheels, and said braking means including a second armature secured to said rotatable annular wheel and a second stationary electromagnet adapted when energized to attract said second armature and to hold against rotation said second armature and said rotatable annular wheel.

WILLIAM MILES THOMAS.
JEAN COTAL.